United States Patent
Kim et al.

(10) Patent No.: US 8,402,538 B2
(45) Date of Patent: Mar. 19, 2013

(54) METHOD AND SYSTEM FOR DETECTING AND RESPONDING TO HARMFUL TRAFFIC

(75) Inventors: Eun Joo Kim, Seoul (KR); Soon Seok Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 618 days.

(21) Appl. No.: 12/620,710

(22) Filed: Nov. 18, 2009

(65) Prior Publication Data

US 2010/0138920 A1 Jun. 3, 2010

(30) Foreign Application Priority Data

Dec. 3, 2008 (KR) .................. 10-2008-0122062
May 26, 2009 (KR) .................. 10-2009-0046007

(51) Int. Cl.
*G06F 11/00* (2006.01)
*G08B 23/00* (2006.01)
*H04L 29/06* (2006.01)

(52) U.S. Cl. ............ 726/22; 726/26; 709/224; 709/238; 713/150; 713/153; 713/154

(58) Field of Classification Search .................. None
See application file for complete search history.

(56) References Cited

U.S. PATENT DOCUMENTS

| | | | |
|---|---|---|---|
| 7,409,712 B1 * | 8/2008 | Brooks et al. | 726/22 |
| 7,712,134 B1 * | 5/2010 | Nucci et al. | 726/23 |
| 2006/0137011 A1 | 6/2006 | Kim et al. | |
| 2007/0133408 A1 | 6/2007 | Park et al. | |
| 2007/0157306 A1 | 7/2007 | Elrod et al. | |
| 2008/0168551 A1 * | 7/2008 | Eom et al. | 726/14 |
| 2010/0071062 A1 * | 3/2010 | Choyi et al. | 726/23 |

FOREIGN PATENT DOCUMENTS

| | | |
|---|---|---|
| KR | 10-0427179 | 4/2004 |
| KR | 10-0596395 | 7/2006 |
| KR | 1020060130892 | 12/2006 |
| KR | 1020080021492 | 3/2008 |
| KR | 10-0819036 | 4/2008 |
| KR | 1020080067549 | 7/2008 |

* cited by examiner

*Primary Examiner* — Nathan Flynn
*Assistant Examiner* — Trang Doan
(74) *Attorney, Agent, or Firm* — Nelson Mullins Riley & Scarborough LLP; EuiHoon Lee, Esq.

(57) ABSTRACT

There is provided a method and system for detecting and responding to harmful traffic. The system includes a router determining whether or not received data is harmful traffic, by using a dynamic flow identification (DFI) function and a deep packet inspection (DPI) function, sending Cflowd information of the received data, and then encapsulating the received data when the received data is determined to be harmful traffic, a policy & resource control entity receiving the Cflowd information from the router, determining whether or not the received data is harmful traffic by using the received Cflowd information, and then sending a result of the determination to the router, and a security management server receiving the encapsulated data from the router, reconfirming whether or not the encapsulated data is harmful traffic, and then processing the encapsulated data.

12 Claims, 4 Drawing Sheets

METHOD AND SYSTEM FOR DETECTING AND RESPONDING TO HARMFUL TRAFFIC

CROSS-REFERENCE TO RELATED APPLICATIONS

This application claims the priorities of Korean Patent Application No. 10-2008-0122062 filed on Dec. 3, 2008, and Korean Patent Application No. 10-2009-0046007 filed on May 26, 2009 in the Korean Intellectual Property Office, the disclosures of which are incorporated herein by reference.

BACKGROUND OF THE INVENTION

1. Field of the Invention

The present invention relates to a method and system for detecting and responding to harmful traffic in real time in an All-IP convergence network, and more particularly, to a method and system for detecting and responding to harmful traffic, capable of facilitating the implementation of a sinkhole tunnel technique even in the case of an unknown pattern of harmful traffic, which includes a distributed attack and a virus, by using the policy routing function of a router and a policy & resource control entity.

2. Description of the Related Art

In order to detect and prevent a Distributed Denial of Service (DDoS) attack, methods such as pattern-based filtering techniques or queue management techniques are typically used. In most cases, these typical methods observe traffic on a network and detect a DDoS attack; however, they have limitations in that only known patterns are detected and prevented.

In order to solve this limitation, there has been proposed a sinkhole tunneling technique in which data is caused to pass through a predetermined tunnel without changing the next hop address of a destination address, required operations such as access control list (ACL), rate-limit or analysis are performed in the tunnel, and then the data, when determined to be normal data, is let out of the tunnel such that the data can be sent to an original destination. This attack prevention method requires a sinkhole router connected to analysis modules, and needs to generate a tunnel that introduces packets from a router into the sinkhole router.

However, no sinkhole tunneling techniques according to the related art define a method of detecting and responding to harmful traffic of unknown patterns in real time, without using a separate sinkhole router.

SUMMARY OF THE INVENTION

An aspect of the present invention provides a method and system for detecting and responding to harmful traffic, which can detect and respond to harmful traffic even of an unknown pattern, without using a separate sinkhole router.

An aspect of the present invention also provides a method and system for detecting and responding to harmful traffic, which can detect and respond to harmful traffic infected with a virus containing an unknown signature, by using a pattern analyzer of a policy & resource control entity.

An aspect of the present invention also provides a method and system for detecting and responding to harmful traffic, which can detect and respond to harmful traffic including attack traffic and virus traffic by using the policy routing function of a router and a policy & resource control entity.

According to an aspect of the present invention, there is provided a system for detecting and responding to harmful traffic, including: a router determining whether or not received data is harmful traffic, by using a dynamic flow identification (DFI) function and a deep packet inspection (DPI) function, sending Cflowd information of the received data, and then encapsulating the received data when the received data is determined to be harmful traffic; a policy & resource control entity receiving the Cflowd information from the router, determining whether or not the received data is harmful traffic by using the received Cflowd information, and then sending a result of the determination to the router; and a security management server receiving the encapsulated data from the router, reconfirming whether or not the encapsulated data is harmful traffic, and then processing the encapsulated data.

According to another aspect of the present invention, there is provided a method of detecting and responding to harmful traffic, including: determining whether or not received data is harmful traffic; encapsulating the received data when the received data is determined to be harmful traffic; and reconfirming whether or not the encapsulated data is harmful traffic, and then processing the encapsulated data.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings. Moreover, detailed descriptions related to well-known functions or configurations will be ruled out in order not to unnecessarily obscure subject matters of the present invention.

In the present invention, harmful traffic includes distributed attack traffic, a virus and the like.

Figure 1:
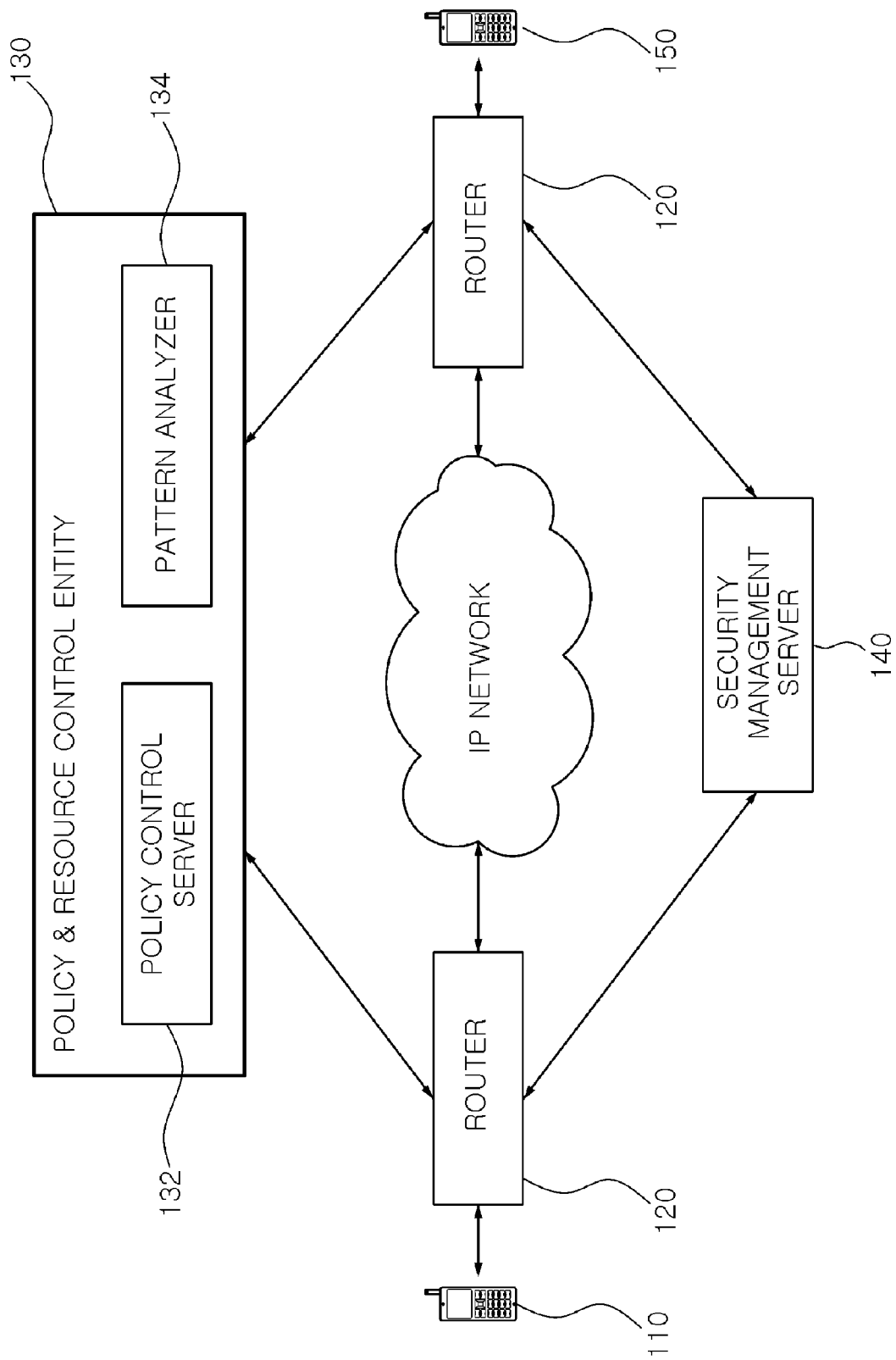
FIG. 1 is a block diagram illustrating a method and system for detecting and responding to harmful traffic according to an exemplary embodiment of the present invention.

FIG. 1 is a block diagram for explaining a method and system for detecting and responding to harmful traffic according to an exemplary embodiment of the present invention.

Referring to FIG. 1, a method and system for detecting and responding to harmful traffic, according to an exemplary embodiment, includes a router 120, a policy & resource control entity 130, and a security management server 140.

A transmission terminal 110 and a reception terminal 150 have IP addresses, and are capable of providing Voice over Internet Protocol (VoIP) services and Multi-Media over IP (MMoIP) services. Examples of the transmission and reception terminals 110 and 150 may include cellular phones, portable digital assistants (PDAs) and smart phones.

The router 120 has a policy routing function. The router 120 determines whether or not received data is harmful traffic including a known pattern of signature by using a dynamic flow identification (DFI) function and a deep packet inspection (DPI) function. Simultaneously, the router 120 sends Cflowd information of the received data to a pattern analyzer 134 of the policy & resource control entity 130. The Cflowd information includes a source IP address, a destination IP address, a next-hop IP address, a packet, a byte, a flow start time, a flow end time, a source port, a destination port, and an IP protocol.

That is, the router 120 detects harmful traffic relevant to a distributed attack with a known pattern by using a DFI function, and detects harmful traffic relevant to a known virus by using a DPI function.

In addition, the router 120 encapsulates data determined to be harmful traffic, by using an IP encapsulation function, adds a header, which designates the IP address of the security management server 140 as a receiver, to the encapsulated data, and sends it to the security management server 140.

According to this embodiment, the policy & resource control entity 130 exists in a transport stratum, and includes a policy control server 132 and a pattern analyzer 134.

The policy control server 132 sends DFI information and DPI information to the router 120 so that the router 120 can perform a DFI function and a DPI function. The DFI information includes ranges regarding duration, an average packet size, an average transfer rate, and a byte count. When data is out of such ranges, the router 120 considers the corresponding data to be harmful traffic.

The pattern analyzer 134 determines whether or not received data is harmful traffic including an unknown pattern or signature by using Cflowd information received from the router 120, and sends the result of determination to the router 120.

The security management server 140 receives encapsulated data from the router 120, and reconfirms whether or not the encapsulated data is harmful traffic. When the encapsulated data is not harmful traffic, that is, when the encapsulated data is normal traffic, the security management server 140 decapsulates the encapsulated data by using an IP decapsulation function, removes a header containing the IP address of the security management server 140, and then sends it to the router 120.

When encapsulated data is harmful traffic, the security management server 140 stores a source IP address of the encapsulated data, deletes the encapsulated data, and sends information relevant to the source IP address to the policy control server 132.

The policy control server 132 adjusts policy on data having the source IP address and activates the corresponding policy by sending it to the router 120. In detail, the policy control server 132 causes the router 120 to manage the Quality of Service (QoS) (e.g., rate limit or the like) of data having the source IP address and to control data flows from a user using the source IP address.

Figure 2:
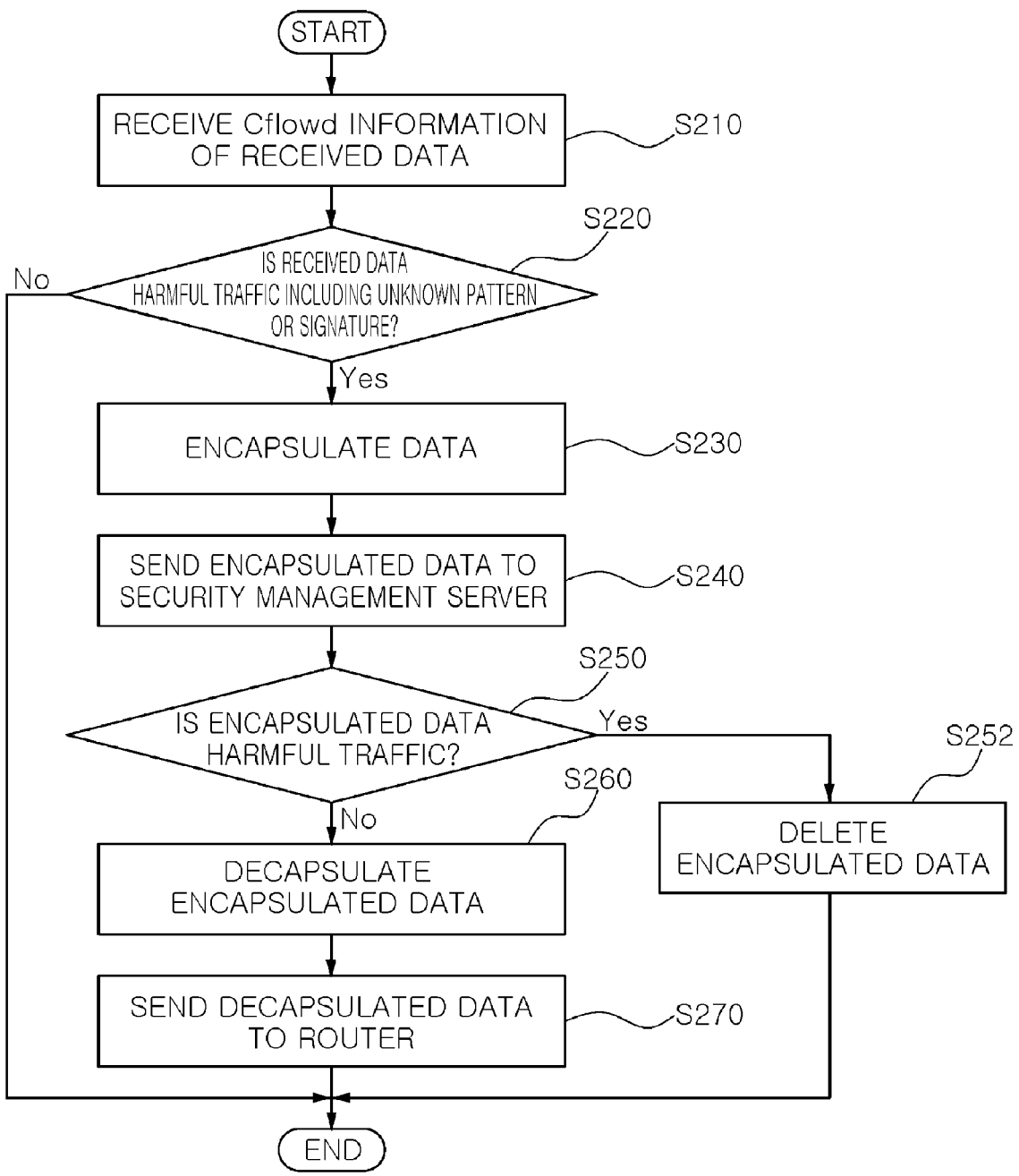
FIG. 2 is a flowchart illustrating a method of detecting and responding to harmful traffic, applied when the harmful traffic includes an unknown pattern or signature.

FIG. 2 is a flowchart showing a method of detecting and responding to harmful traffic, applied when the harmful traffic includes an unknown pattern or signature.

Referring to FIG. 2, the pattern analyzer 134 receives Cflowd information of data received from the router 120 in operation S210, and determines, using the Cflowd information, whether or not the received data is harmful traffic including an unknown pattern or signature in operation S220.

When the corresponding data is determined to be harmful traffic in operation S220, the pattern analyzer 134 sends the result of determination to the router 120, and the router 120 encapsulates the data by using an IP encapsulation function in operation S230. In operation S240, the router 120 adds a header, designating the IP address of the security management server 140 as a receiver, to the encapsulated data, and sends it to the security management server 140.

The security management server 140 reconfirms whether or not the encapsulated data is harmful traffic in operation S250, and deletes the encapsulated data when the encapsulated data is confirmed to be harmful traffic, in operation S252.

When the encapsulated data is not harmful traffic in operation S250, the security management server 140 decapsulates encapsulated data in operation S260, removes the header containing the IP address of the security management server 140, and then sends it to the router 120 in operation S270.

Figure 3:
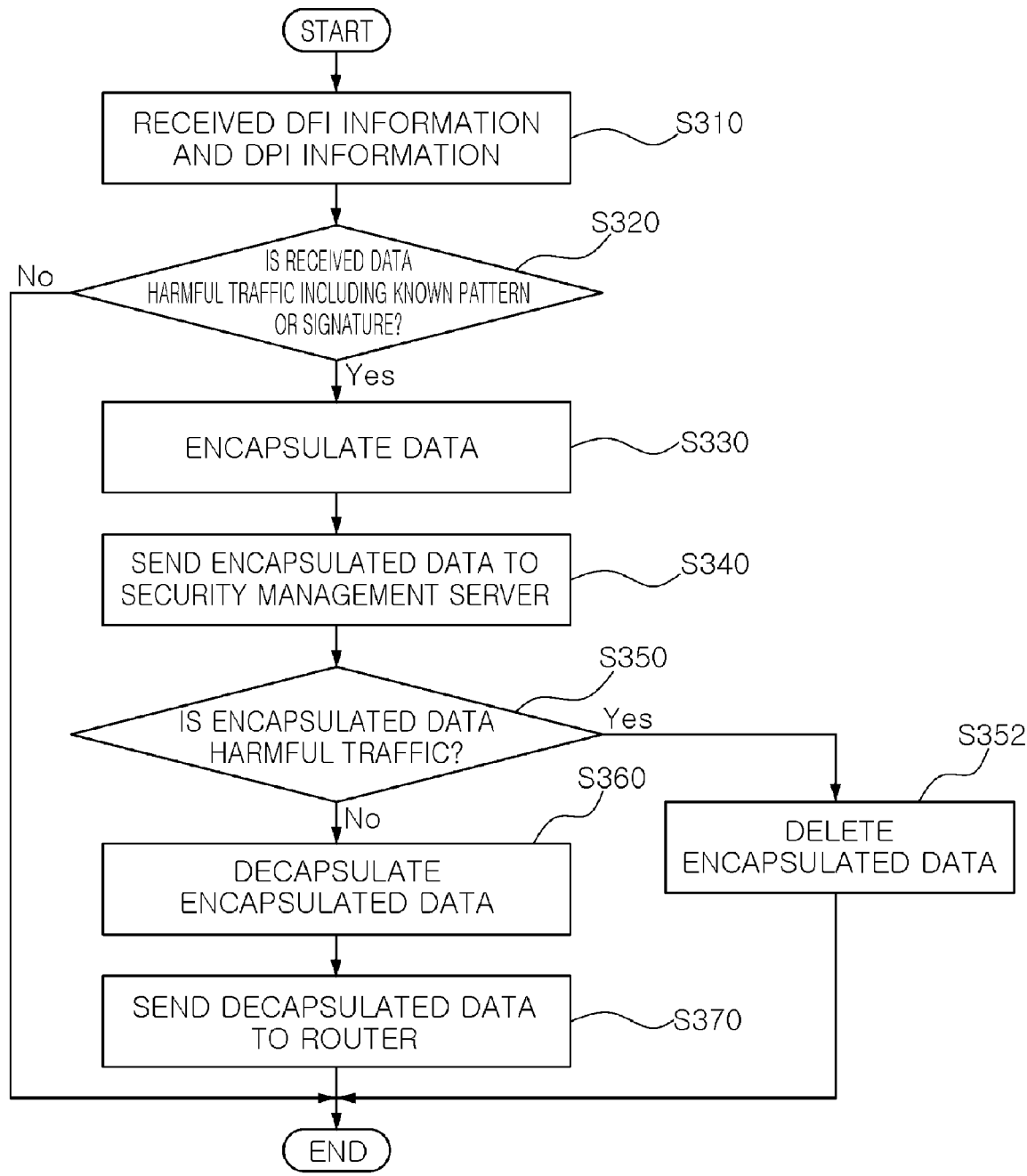
FIG. 3 is a flowchart illustrating a method of detecting and responding to harmful traffic, applied when the harmful traffic includes a known pattern or signature.

FIG. 3 is a flowchart illustrating a method of detecting and responding to harmful traffic, applied when the harmful traffic includes a known pattern or signature.

Referring to FIG. 3, the router 120 receives DFI information and DPI information from the policy control server 132 in order to perform a DFI function and a DPI function in operation S310, and determines, using the DFI function and the DPI function, whether or not received data is harmful traffic including a known pattern or signature in operation S320.

The router 120 encapsulates the data using an IP encapsulation function in operation S330. In operation S340, the router 120 adds a header, designating the IP address of the security management server 140 as a receiver, to the encapsulated data, and sends it to the security management server 140.

The security management server 140 reconfirms whether or not the encapsulated data is harmful traffic in operation S350. In operation S352, the security management server 140 deletes the encapsulated data when the encapsulated data is confirmed to be harmful traffic.

When the encapsulated data is not harmful traffic in operation S350, the security management server 140 decapsulates the encapsulated data in operation S360, removes the header containing the IP address of the security management server 140, and sends it to the router 120 in operation S370.

Figure 4:
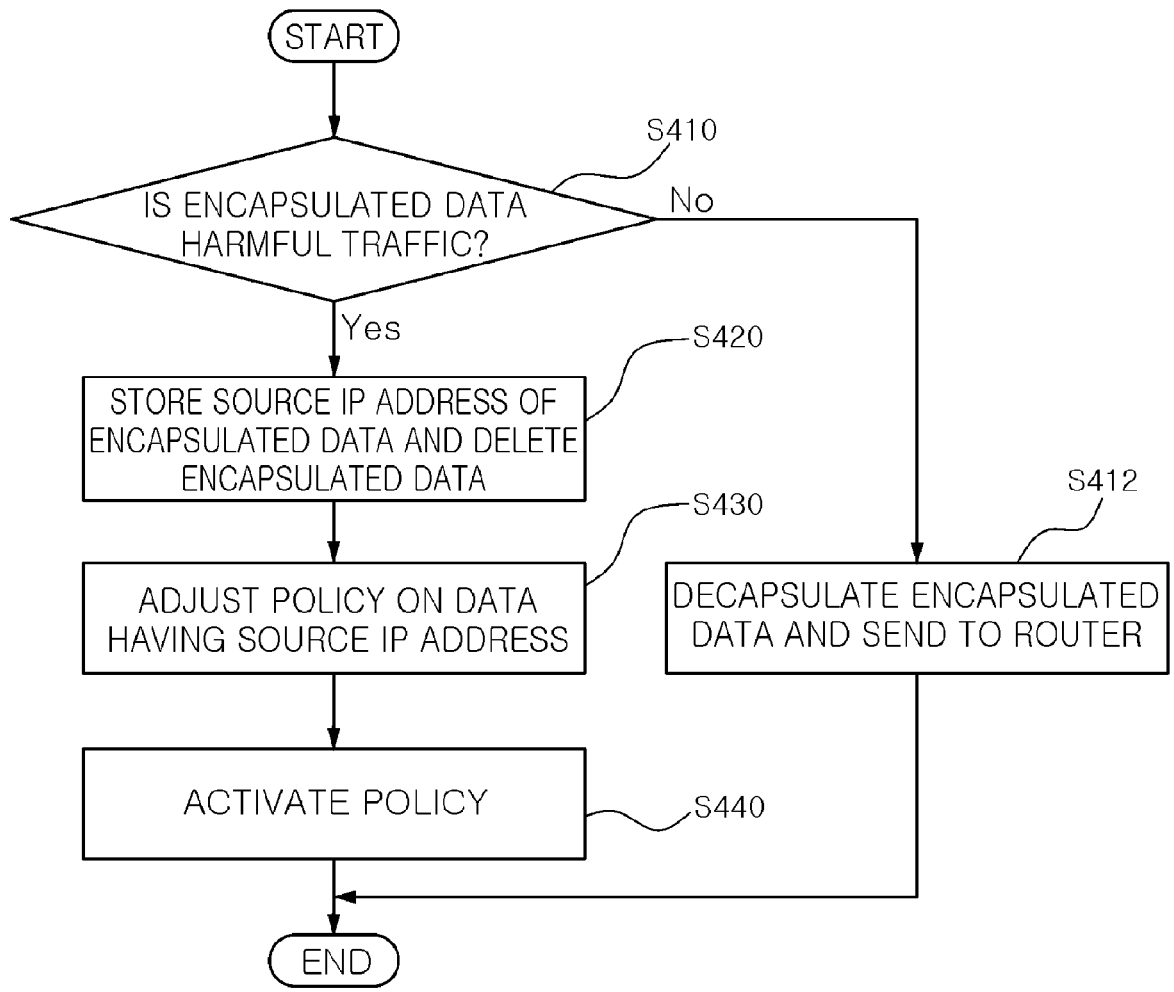
FIG. 4 is a flowchart illustrating a method of responding to harmful traffic according to an exemplary embodiment of the present invention.

FIG. 4 is a flowchart illustrating a method of responding to harmful traffic according to an exemplary embodiment of the present invention.

Referring to FIG. 4, the security management server 140 receives encapsulated data from the router 120 and reconfirms whether or not the encapsulated data is harmful traffic in operation S410.

When the encapsulated data is harmful traffic, the security management server 140 stores the source IP address of the encapsulated data, and deletes the encapsulated data in operation S420.

Thereafter, the security management server 140 sends the source IP address to the policy control server 132. Then, the policy control server 132 adjusts the policy on data having the source IP address in operation S430, and activates the policy by sending it to the router 120 in operation S440. That is, the policy control server 132 causes the router 120 to manage the QoS (e.g., rate limit or the like) of data having the source IP address and to control a data flow from a user using the source IP address.

When the encapsulated data is not harmful traffic, the security management server 140 decapsulates the encapsulated data, and sends it to the router 120 in operation S412.

As set forth above, according to exemplary embodiments of the invention, there is provided a method and system for detecting and responding to harmful traffic, which is capable of easily implementing a sinkhole tunnel technique by using the policy routing function of the router and the policy & resource control entity, so that various harmful traffic, including an unexpected security attack, can be effectively detected and handled.

While the present invention has been shown and described in connection with the exemplary embodiments, it will be apparent to those skilled in the art that modifications and variations can be made without departing from the spirit and scope of the invention as defined by the appended claims.

What is claimed is:

1. A system for detecting and responding to harmful traffic, the system comprising:
   a router determining whether or not received data is harmful traffic, by using a dynamic flow identification (DFI) function and a deep packet inspection (DPI) function, sending Cflowd information of the received data, and then encapsulating the received data when the received data is determined to be harmful traffic;
   a policy & resource control entity receiving the Cflowd information from the router, determining whether or not the received data is harmful traffic by using the received Cflowd information, and then sending a result of the determination to the router; and
   a security management server receiving the encapsulated data from the router, reconfirming whether or not the encapsulated data is harmful traffic, and then processing the encapsulated data.

2. The system of claim 1, wherein the policy & resource control entity comprises:
   a policy control server providing DFI information and DPI information to the router; and
   a pattern analyzer determining whether or not the received data is harmful traffic, by using the Cflowd information.

3. The system of claim 2, wherein when the encapsulated data is determined to be harmful traffic, the security management server stores a source Internet protocol (IP) address of the encapsulated data, and deletes the encapsulated data.

4. The system of claim 3, wherein the security management server sends the source IP address to the policy control server.

5. The system of claim 4 wherein the policy control server causes the router to manage quality of service (QoS) of data having the source IP address and to control a data flow from a user using the source IP address.

6. The system of claim 1, wherein the security management server decapsulates the encapsulated data and sends the decapsulated data to the router when the encapsulated data is normal traffic.

7. The system of claim 1, wherein the Cflowd information includes at least one of a source Internet protocol (IP) address, a source IP address, a next-hop IP address, a packet, a byte, a flow start time, a flow end time, a source port, a destination port, and an Internet protocol.

8. A method of detecting and responding to harmful traffic, the method comprising:
   determining, by a router, whether or not received data is harmful traffic;
   encapsulating, by the router, the received data when the received data is determined to be harmful traffic; and
   reconfirming, by a security management server, whether or not the encapsulated data is harmful traffic, and then processing the encapsulated data,
   wherein the determining of whether or not the received data is harmful traffic comprises:
   determining whether or not the received data is harmful traffic by using a dynamic flow identification (DFI) function and a deep packet inspection (DPI) function, when the received data is determined to be harmful traffic including a known pattern or signature; and
   determining whether or not the received data is harmful traffic by using Cflowd information of the received data, when the received data is determined to be harmful traffic including an unknown pattern or signature.

9. The method of claim 8, wherein the Cflowd information includes at least one of a source Internet protocol (IP) address, a source IP address, a next-hop IP address, a packet, a byte, a flow start time, a flow end time, a source port, a destination port, and an Internet protocol.

10. The method of claim 8, wherein the processing of the encapsulated data comprises:
    storing, by the security management server, a source Internet protocol (IP) address of the encapsulated data and deleting the encapsulated data, when the encapsulated data is confirmed to be harmful traffic.

11. The method of claim 10, wherein the processing of the encapsulated data further comprises:
    decapsulating, by the security management server, the encapsulated data and sending the decapsulated data to the router, when the encapsulated data is normal traffic.

12. The method of claim 10, further comprising:
    managing, by the router, quality of service (QoS) of data having the source IP address, and controlling a data flow from a user using the source IP address.

* * * * *